Dec. 15, 1953  J. W. GIFFEN  2,662,347
GLASS FORMING MOLD
Filed May 5, 1951
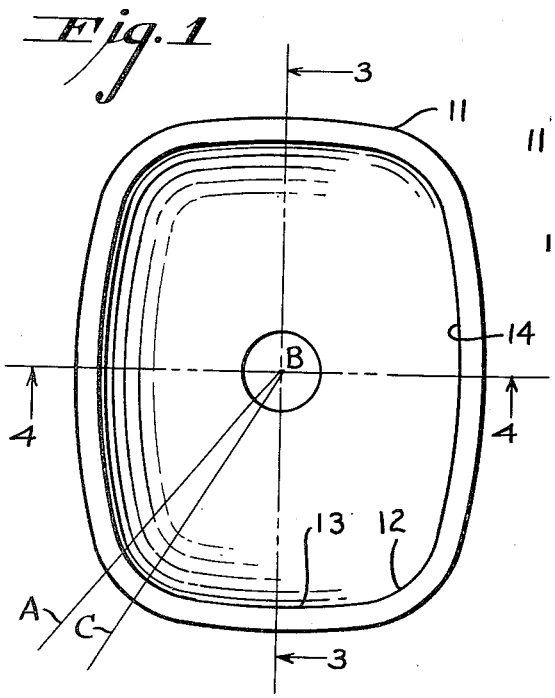
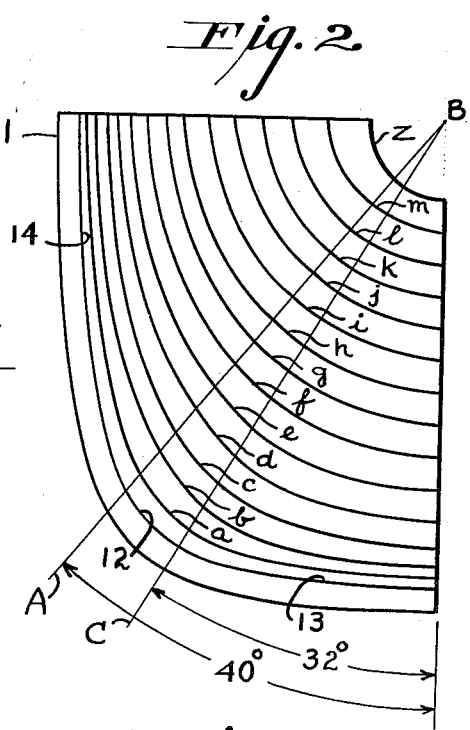
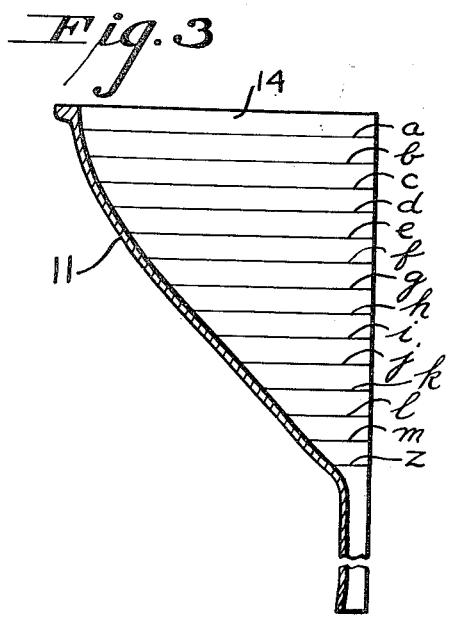
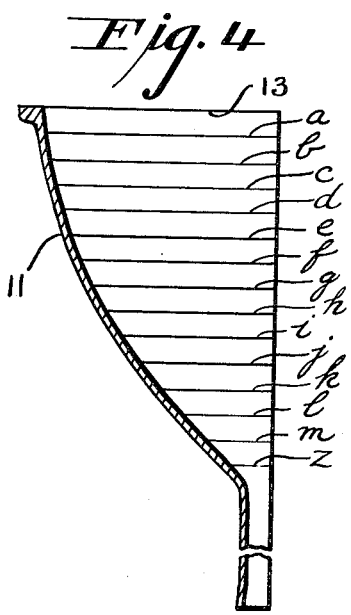
INVENTOR.
JAMES W. GIFFEN
BY Rolf C. Schneider
ATTORNEY.

Patented Dec. 15, 1953

2,662,347

UNITED STATES PATENT OFFICE 2,662,347

GLASS FORMING MOLD

James W. Giffen, Corning, N. Y., assignor to Corning Glass Works, Corning, N. Y., a corporation of New York Application May 5, 1951, Serial No. 224,747

18 Claims. (Cl. 49—65)

The present invention relates to the manufacture of hollow glass bodies, and is particularly concerned with the provision of molds suitable for use in the centrifugal formation of conically shaped hollow glass articles having base ends of noncircular outline.

In the transmission of television pictures a rectangular pattern of 4:5 ratio is regularly employed; and the use of a screen of corresponding rectangular shape to receive such pictures would appear not only desirable but obvious. Because of the greater difficulties encountered in the manufacture of all-glass television picture tubes embodying rectangular screens, however, circular screen tubes have been made almost exclusively in the past despite the fact that only a portion of the total screen area could be utilized. Nevertheless, with the gain in popularity of larger picture-viewing screens and because of the space-saving advantage that rectangular screen tubes afford, the economical production of all-glass rectangular tubes has become imperative.

All-glass television picture tubes, as will be appreciated because of their size, are customarily made by separately forming the funnel portion and the panel or screen portion and then sealing such portions together. While such funnel portions can be made by conventional pressing or blowing procedures, the centrifugal formation of funnels by the system disclosed in my pending application S. N. 107,945 filed August 1, 1949 has been assuming a continually growing importance since its recent introduction into the art. Not only are centrifugally formed funnels considerably lighter in weight than pressed or blown funnels of corresponding size, but my centrifugal forming procedure permits the production of the funnel portion and the neck portion as an integral unit. Compared to blown funnels, centrifugally formed funnels also possess the further advantage in that, as formed, they are automatically made ready for sealing to the screen portion, whereas a blown funnel must have its large end closure removed before it is ready for sealing to a screen panel.

Circular screen funnels are readily manufactured centrifugally since they are radially uniform symmetrical articles of revolution. Inherently, if a charge of molten glass is properly centered on the bottom of a circular funnel mold and the mold is rotated with its axis of rotation in a vertical plane, the glass will be centrifugally advanced up its conical sidewall at a substantially uniform rate. The rate of movement of the glass, of course, is dependent on its viscosity, the speed of rotation of the mold, and the temperature of the mold or its chilling effect on the glass as it travels up the conical mold wall.

On the other hand funnels adapted for use with picture screens of a shape to more efficiently portray a 4:5 rectangular picture have heretofore been generally conceded to be impracticable if not impossible of centrifugal production. As will be readily apparent, such a television tube funnel naturally lacks uniform radial symmetry. Accordingly a uniform rate of flow of molten glass up the sidewall of a mold for the formation of such a funnel can not be expected to occur. Furthermore, such distribution of glass as would be attained in such circumstances would, because of such lack of uniform radial symmetry, be modified in an unpredictable manner with mold temperature changes. Accordingly, for lack of any better known method of manufacturing funnels of the above character, the industry has necessarily resorted to conventional pressing methods to produce such tube funnels.

I have now discovered, after extensive experimentation and study, that a picture tube funnel adapted for use with a noncircular screen can be satisfactorily formed by centrifugal action. Such manufacture, however, requires that the mold wall contours afford glass flow paths adapted to regulate the molten glass movement in such a manner as to attain the desired glass distribution over the mold wall coincident with the mold attaining the optimum operating temperature and in a manner to insure that the leading edge or margin of the molten glass reaches the open end of the mold cavity at substantially the same time along its entire perimeter.

In the development of molds for the manufacture of picture tube funnels adapted for the receipt of noncircular screens I have also observed that, aside from the outward and upward flow of molten glass effected by centrifugal action, there is a certain rotary component of movement or slippage of the glass over the mold wall as the mold is being accelerated. In the manufacture of tube funnels for use with the smaller size screens, such movement or slippage has been found insufficient to objectionably interfere with the proper distribution of the glass. With funnels for use with screens having a maximum dimension in excess of approximately 16 inches, such rotary component of movement has been found, however, to objectionably increase, and it becomes advantageous in the manufacture of tube funnels of such larger sizes to appropriately adjust the wall contour to compensate for the slippage resulting from mold acceleration in the manner hereinafter set forth.

Since the transmitted pictures are over a 4:5 rectangular area, as indicated above, the ideal screen outline configuration is also rectangular. Although it is possible to adjust the mold wall contours to centrifugally produce a tube funnel adapted for use with a substantially rectangular screen, a number of other problems in the manufacture of a completed envelope, in particular the provision of adequate strength to prevent collapse of the finished tube upon its evacuation, requires that the funnel base be essentially rectangular to substantially elliptical in outline, i. e., a rectangle with outwardly bowed sides or an ellipse with the portions at the ends of its major axis slightly compressed, as the case may be.

As will be clearly evident, if the wall of the mold to be employed to form a tube funnel of the above character is straight from its vertex or inner end to its noncircular open end, the resistance to the centrifugal flow of molten glass up such wall will vary in accordance with the length and steepness of the particular path. With such a mold having an essentially rectangular to substantially elliptical outline at the open end, the paths over the wall to the diagonal corners of the outline will be longer but less steep than those over the wall to the laterally disposed opposite sides. Owing to the generally rectangular outline of the large end of the mold, the wall between the diagonals on the long side will afford the shortest but the steepest path while the wall between the diagonals on the short side or end will afford a path of intermediate length and steepness. If a mold having a wall of the foregoing configuration has a molten glass charge deposited therein and is then rotated in the fashion taught in my copending application, most of the glass will follow the diagonal paths out over the mold edge, and over the wall portions therebetween the glass will never attain any substantial height.

I have now found, however, that by suitable variation of the steepness of the various portions of the mold wall throughout its area, the resistance to centrifugal glass flow over such wall can be so controlled that on rotation of the mold the leading edge of the molten glass will reach the open end or upper margin of the mold along its entire perimeter substantially simultaneously. In other words, the slope or concavity of the mold cavity wall can be so varied that the resistance to the outward movement of the molten glass is initially greatest in those perimeter sectors whose arcs are most remote transversely from the axis of rotation of the mold and is subsequently greatest in those perimeter sectors whose arcs are transversely nearest the axis of rotation of the mold. With such arrangement a substantially uniform distribution of glass is obtained over the entire mold cavity wall, and the flow of glass can be so controlled that only a minimum amount of glass needs to be trimmed from the resulting conically shaped form to provide the desired funnel.

It is to be understood that the "open end of the mold," as that term is used herein, corresponds to the level at which the centrifugally formed funnel is trimmed to effect severance of such excess glass therefrom. As will be appreciated and as indicated in my aforementioned application, the wall of the mold cavity desirably extends above such trim line or level in order to accommodate such excess glass and to prevent its being thrown out over the edge of the mold. The shape of the mold wall above such level is of no particular significance, however; for, so long as the shape of the mold cavity is such that the leading edge of the centrifugally distributed molten glass reaches such level at substantially the same time along its entire perimeter whereby uniform distribution of the glass over the mold cavity wall is assured, the manner in which the excess glass distributes itself above that level has no effect on the formation of the funnel itself.

As will be more fully brought out hereinafter, the cross section of the wall contour of a mold according to the invention for use in centrifugally forming tube funnels adapted for use with screens of the foregoing defined generally rectangular outline may be best defined at any given level as a modified ellipse, i. e., one whose major and minor axes have been more or less bulged out or flattened as the case may be. As will be apparent from the above description, such ellipses over a portion of the mold wall have their long dimension parallel to the long dimension of the outline of the large end of the mold cavity and those over the remaining portion of the mold wall have their long dimension parallel to the short dimension of such cavity outline or normal to the long dimension of the first defined ellipses. Advantageously, the major and minor axes of such ellipses decrease in length independently of each other. While desirably no portion of the resulting funnel wall should be concave so that the finished tube can safely withstand evacuation, the slope of the mold wall along the diagonals of the rectangular outline may conveniently be substantially constant in slope. Additionally, to compensate for the rotary component of movement or slippage of the glass in the larger size molds, the axes of at least some of the ellipses adjacent the inner end of the mold are desirably located or shifted forward with respect to the direction of mold rotation a distance depending on the mold size.

By following such practices a tube funnel having a noncircular outline and having all of the advantages of a centrifugally produced circular tube funnel can be centrifugally formed.

In the accompanying drawing:

Fig. 1 is a top plan view of a mold embodying the invention.

Fig. 2 is an enlarged top plan view of a quarter-section of such mold.

Fig. 3 is an enlarged sectional elevation of a quarter-section of such mold taken on center line 3—3 of Fig. 1.

Fig. 4 is an enlarged sectional elevation of a quarter-section of such mold taken on center line 4—4 of Fig. 1.

In the description of the invention, it will first be assumed that the illustrated mold 11 is of a size required to produce a 70° conical television picture tube funnel with the hereinbefore defined essentially or generally rectangular screen receiving base having rounded corner portions joined by curved end and side portions and being approximately 14⅝ inches by 18⅜ inches with a diagonal of approximately 19¾ inches. In such case, each of the corner outlines 12 of the mold joining an end outline 13 and a side outline 14, such outlines collectively defining the outline of the open end of the mold, is an arc on a radius of approximately 3½ inches. Each end outline 13 is then an arc on a radius of approximately 26½ inches, and each side outline 14 is an arc on a radius of approximately 34 inches.

The radius of curvature of the mold wall sections below the defined corner outlines becomes progressively greater down to an intermediate level in the cavity and then becomes progressively smaller as the inner or smaller end of the mold is approached. At the levels represented by lines a—f, the radius of such corner outline curvature gradually ranges upwardly from approximately 3⅝ inches to 5½ inches, whereas at the levels represented by lines g—m the radius of curvature ranges gradually downwardly from approximately 12⅜ inches to 3⅜ inches.

In a similar manner, the radii of curvature of the adjoining end and side outlines become progressively smaller as the apex of the mold cavity is approached. The radius of curvature of such end outlines 13 at the levels represented by lines a—m in such areas progressively ranges from 20 inches down to 2½ inches. Similarly, the radius of curvature of such side outlines 14 at the levels represented by lines a—m in such areas progressively ranges from 25 inches down to 2 inches.

The centers about which the end outline arcs are struck are located on the center line 3—3 (Fig. 1), and the centers about which the side outline arcs are struck are located on the center line 4—4. The corner outline arcs connecting the end and side outline arcs are struck from floating centers selected to provide the best blend of the corner outline arcs with the side and end outline arcs after the side outline arcs pass through a line A—B approximately 40° from center line 3—3 and the end outline arcs pass through a line B—C approximately 32° from such center line. The conical mold cavity near its apex at the level designated by line z becomes approximately circular and therebelow ordinarily takes a flared tubular form as indicated so that the television tube neck can be formed integrally with the funnel.

From the foregoing it will be appreciated that the transverse outline or cross section of such a "rectangular" mold cavity is essentially a circle at its apex, is in general a modified ellipse in the levels from lines m—i with its major axis transverse to the 18⅜ inch dimension of the open end of the mold, and in the levels from lines h—a is also in general a modified ellipse, but with its major axis parallel to such 18⅜ inch dimension. In the median level of line i the cavity outline is in general approximately circular and concentric to the circular outline z.

As will be understood, the indicated variations in mold contour are those specifically applicable to a mold for the manufacture of 70° apex angle funnels with their large open ends of the noncircular outline depicted. For the formation of funnels with different apex angles or with different noncircular open ends or of different sizes or at other operating temperatures, appropriate variations of the cavity wall contour in accordance with the invention are of course necessary.

The wall contour of such mold, as indicated above, is advantageously made to act as a barrier to the rotary component of movement imparted to the molten glass during its distribution. Accordingly, at at least some of the levels represented by lines g—m, the axes of the ellipses represented by these lines are desirably located forward through an arc varying from 2 to 5°. Similarly for a mold for the production of 24 inch (diagonal) funnels, the axes of such ellipses are desirably moved forward through arcs of from in the neighborhood of 4 to 8°.

Molds embodying the present invention are interchangeable with that illustrated in the centrifugal system described in my copending application. On attaining its optimum operating temperature, such a mold will regulate the distribution of molten glass over its cavity wall in a fashion to produce funnels which are far superior to any corresponding funnels made by prior methods and which have all the virtues of a centrifugally formed circular funnel.

What is claimed is:

1. An open-ended mold in which a generally conical or funnel-shaped hollow glass body, the base or open end of which is noncircular in outline, can be formed by centrifugal distribution outwardly over the wall of its cavity toward its open end of a charge of molten glass deposited adjacent the vertex end thereof, the cross-sectional outline of said cavity in the region extending from adjacent its open end to an intermediate transverse zone being noncircular, the elements of the wall of said cavity terminating at the open end thereof at those points most remote transversely from the axis of rotation of the mold being substantially most remote from such axis throughout said region and the elements of said cavity wall terminating at the open end of the cavity at those points transversely nearest such axis being substantially nearest such axis throughout said region, the cross-sectional outline of said cavity in the region extending from said intermediate zone to adjacent its vertex end being noncircular, the elements of the wall of said cavity terminating at the open end thereof at those points most remote transversely from the axis of rotation of the mold being substantially nearest such axis throughout said latter region and the elements of said cavity wall terminating at the open end of the cavity at those points transversely nearest such axis being substantially most remote from such axis throughout said latter region, the elements of said cavity wall terminating at the open end of the cavity at those points most remote transversely from the axis of rotation of the mold being substantially the steepest in the region extending from adjacent the vertex end to said intermediate transverse zone to initially retard the outward movement of the molten glass along such elements, and the elements of such wall terminating at the open end of the cavity at those points transversely nearest the axis of rotation of the mold being substantially the steepest in the region extending from said intermediate zone to adjacent said open end to subsequently retard the outward movement of the molten glass along such latter elements, the cavity wall being thereby so constructed and arranged that the leading edge of the distributed molten glass reaches the open end of the cavity at substantially the same time along its entire perimeter.

2. An open-ended mold in which a generally conical or funnel-shaped hollow glass body, the base or open end of which is essentially rectangular to substantially elliptical in outline, can be formed by centrifugal distribution outwardly over the wall of its cavity toward its open end of a charge of molten glass deposited adjacent the vertex end thereof, said cavity from adjacent its open end to an intermediate transverse zone and also from such intermediate zone to adjacent its vertex end being a modified ellipse in cross-sectional outline, the major axes of such ellipses from the open end of the cavity to such intermediate zone being substantially normal to the major axes of such ellipses from such intermediate zone to the vertex end of the cavity, the cavity wall between the vertex end of such cavity and said intermediate zone being so constructed and arranged as to impart the greatest steepness to the glass flow paths along those elements terminating at the open end of the cavity at those points substantially most remote transversely from the axis of rotation of the mold and the least steepness to the glass flow paths along those elements terminating at the open end of the cavity at those points substantially transversely nearest the axis of rotation of the mold, and the cavity wall between said intermediate zone and the open end of said cavity being so constructed and arranged as to impart steepness to the glass flow paths along the aforesaid elements in the inverse order, whereby the leading edge of the distributed molten glass reaches the open end of the cavity at substantially the same time along its entire perimeter.

3. A mold as claimed in claim 2, the open end of which is essentially rectangular in outline and in which the slope of the cavity wall along the elements terminating at the open end of the cavity substantially at its diagonals is substantially constant.

4. An open-ended mold in which a generally conical or funnel-shaped hollow glass body, the base or open end of which is essentially rectangular to substantially elliptical in outline, can be formed by centrifugal distribution outwardly over the wall of its cavity toward its open end of a charge of molten glass deposited adjacent the vertex end thereof, said cavity from adjacent its open end to an intermediate transverse zone and also from such intermediate zone to adjacent its vertex end being a modified ellipse in cross-sectional outline, the major axes of such ellipses from the open end of the cavity to such intermediate zone being substantially normal to the major axes of such ellipses from such intermediate zone to the vertex end of the cavity with the major axes of at least some of such ellipses from the vertex end of the cavity to such intermediate zone being shifted slightly forward in the intended direction of rotation of the mold with respect to normal to the major axes of such ellipses from such intermediate zone to the open end of the cavity to offset the inertia of the molten glass upon acceleration of the mold, the cavity wall between the vertex end of such cavity and said intermediate zone being so constructed and arranged as to impart the greatest steepness to the glass flow paths along those elements terminating at the open end of the cavity at those points substantially most remote transversely from the axis of rotation of the mold and the least steepness to the glass flow paths along those elements terminating at the open end of the cavity at those points substantially transversely nearest the axis of rotation of the mold, and the cavity wall between said intermediate zone and the open end of said cavity being so constructed and arranged as to impart steepness to the glass flow paths along the aforesaid elements in the inverse order, whereby the leading edge of the distributed molten glass reaches the open end of the cavity at substantially the same time along its entire perimeter.

5. An open-ended mold in which a generally conical or funnel-shaped hollow glass body having a base or open end of noncircular outline can be formed by centrifugal distribution outwardly over the wall of its cavity toward its open end of a charge of molten glass deposited adjacent the vertex end thereof, the cross-sectional outline of said cavity from adjacent its open end to an intermediate transverse zone being noncircular, the elements on the wall of said cavity terminating at the points on its open end perimeter most remote transversely from the axis of rotation of the mold being substantially most remote from such axis throughout said region and the elements of said cavity wall terminating at those points on the open end perimeter of the cavity transversely nearest such axis being substantially nearest such axis throughout said region, the cross-sectional outline of said cavity from said intermediate zone to adjacent its vertex end being noncircular, the elements on the wall of said cavity terminating at the points on its open end perimeter most remote transversely from the axis of rotation of the mold being substantially nearest such axis throughout said latter region and the elements of said cavity wall terminating at those points on the open end perimeter of the cavity transversely nearest such axis being substantially most remote from such axis throughout said latter region, the wall of said cavity from adjacent its vertex end to said intermediate zone having the greatest slope substantially along the elements to the points on the open end perimeter of said cavity most remote transversely from the axis of rotation of the mold and the least slope substantially along the elements to the points on the open end perimeter of said cavity transversely nearest the axis of rotation of the mold, the relation of the slopes of the cavity wall along such elements from said intermediate zone to adjacent the open end of the cavity being of the inverse order, said wall in such regions having slopes of intermediate degrees along the elements to the points on the open end perimeter of the cavity of intermediate remoteness from the axis of rotation of the mold, the cavity wall being thereby so constructed and arranged that the degree of slope along each element varies from the vertex end to the open end of the cavity such that, as the mold is rotated, the leading edge of the centrifugally distributed molten glass reaches the open end of the mold at substantially the same time along its entire perimeter.

6. A mold according to claim 5 wherein the least slope of the cavity wall at at least some of the cross sectional outlines between the vertex end of the cavity and the intermediate zone is along elements slightly forward in the intended direction of rotation of the mold from the element to the point on the open end perimeter of the cavity transversely nearest the axis of rotation of the mold in order to offset the inertia of the molten glass upon acceleration of the mold.

7. An open-ended mold in which a generally conical or funnel-shaped hollow glass body having a base or open end essentially rectangular in outline can be formed by centrifugal distribution outwardly over the wall of its cavity toward its open end of a charge of molten glass deposited adjacent the vertex end thereof, the long sides and the short sides of said outline each being outwardly bowed with each long side being joined to its adjacent short sides by arcs, the cavity of said mold from adjacent its vertex end to an intermediate transverse zone and also from such intermediate zone to adjacent its open end being a modified ellipse in cross-sectional outline with the major axes of such modified ellipses from the vertex end of the cavity to such intermediate zone being substantially normal to the major axes of such modified ellipses from such intermediate zone to the open end of said cavity, the wall of said cavity, between its vertex end and such intermediate zone having the greatest slope along the elements to the points on the open end perimeter of said cavity substantially most remote transversely from the axis of rotation of the mold and the least slope along the elements to the points on the open end perimeter of said cavity substantially transversely nearest the axis of rotation of the mold, the relation of the slopes of the cavity wall along such elements between said intermediate zone and the open end of the cavity being respectively of the inverse order, said wall in such regions having slopes of intermediate degrees along the elements to the points on the open end perimeter of the cavity of intermediate remoteness from the axis of rotation of the mold, the cavity wall being thereby so constructed and arranged that the degree of slope along each element varies from the vertex end to the open end of the cavity such that, as the mold is rotated, the leading edge of the centrifugally distributed molten glass reaches the open end of the mold at substantially the same time along its entire perimeter.

8. A mold according to claim 7 in which the slope of the cavity wall along the elements to the points on the open end perimeter of said cavity substantially most remote transversely from the axis of rotation of the mold is substantially constant.

9. A mold according to claim 7 wherein the major axes of at least some of the modified ellipses from the vertex end of the cavity to the intermediate zone are shifted slightly forward in the intended direction of rotation of the mold with respect to the position which would be normal to the major axes of the modified ellipses from such intermediate zone to the open end of the cavity, in order to offset the inertia of the molten glass upon acceleration of the mold.

10. An open-ended mold having a generally conical cavity with its open end uppermost and adapted for rotation about a vertical axis coinciding with the axis of such cavity, said mold being designed for formation of a funnel-shaped hollow glass article by centrifugal distribution over the wall of its cavity of a charge of molten glass deposited in the vertex end thereof, the open end of said cavity being noncircular in outline, the shape of the horizontal cross-sectional outline of the wall of said cavity gradually changing from adjacent its vertex end to adjacent its open end, the wall of the cavity adjacent its vertex end being least steep in those regions along elements terminating at those points on the open end of the cavity substantially transversely nearest the axis of the cavity and steepest in those regions along elements terminating at those points on the open end of the cavity substantially transversely farthest from the axis of the cavity, the wall of said cavity adjacent its open end being least steep in those regions along elements terminating at those points on the open end of the cavity substantially transversely farthest from the axis of the cavity and being steepest in those regions along elements terminating at those points on the open end of the cavity substantially transversely nearest the axis of the cavity, the cavity wall being thereby so constructed and arranged that the leading edge of the molten glass centrifugally distributed thereover reaches the open end of the cavity at substantially the same time along its entire perimeter.

11. A mold as claimed in claim 10, in which the vertex end of the cavity is substantially circular in horizontal or transverse cross-sectional outline.

12. An open-ended mold having a generally conical cavity with its open end uppermost and adapted for rotation about a vertical axis coinciding with the axis of such cavity, said mold being designed for formation of a funnel-shaped hollow glass article by centrifugal distribution over the wall of its cavity of a charge of molten glass deposited in the vertex end thereof, the open end of said cavity being essentially rectangular to substantially elliptical in outline, the shape of the horizontal cross-sectional outline of the wall of said cavity gradually changing from adjacent its vertex end to adjacent its open end, the wall of the cavity adjacent its vertex end being least steep in those regions along elements terminating at those points on the open end of the cavity substantially transversely nearest the axis of the cavity and steepest in those regions along elements terminating at those points on the open end of the cavity substantially transversely farthest from the axis of the cavity, the wall of said cavity adjacent its open end being least steep in those regions along elements terminating at those points on the open end of the cavity substantially transversely farthest from the axis of the cavity and being steepest in those regions along elements terminating at those points on the open end of the cavity substantially transversely nearest the axis of the cavity, the cavity wall being thereby so constructed and arranged that the leading edge of the molten glass centrifugally distributed thereover reaches the open end of the cavity at substantially the same time along its entire perimeter.

13. A mold as claimed in claim 12, in which the vertex end of the cavity is substantially circular in horizontal or transverse cross-sectional outline.

14. A mold as claimed in claim 12, in which certain of the cross-sectional outlines of the cavity near its vertex end are modified ellipses whose major axes are substantially normal to the major axis of the open end of the cavity and in which certain of the cross-sectional outlines of the cavity near its open end are modified ellipses whose major axes are substantially parallel to the major axis of the open end of the cavity.

15. A mold as claimed in claim 14, in which the major axes of some of the modified elliptical outlines are shifted slightly forward in the intended direction of rotation of the mold in order to offset the inertia of the molten glass upon acceleration of the mold.

16. A mold as claimed in claim 12, which includes a coaxial tubular extension at its vertex end.

17. An open-ended mold having a generally conical cavity with its open end uppermost and adapted for rotation about a vertical axis coinciding with the axis of such cavity, said mold being designed for formation of a funnel-shaped hollow glass article by substantially uniform centrifugal distribution over the wall of its cavity of a charge of molten glass deposited in the vertex end thereof, the open end of said cavity being noncircular in outline, the shape of the horizontal cross-sectional outline of the wall of said cavity gradually changing from adjacent its vertex end to adjacent its open end, the wall of the cavity adjacent its vertex end being least steep in those regions along elements terminating at those points on the open end of the cavity substantially transversely nearest the axis of the cavity and steepest in those regions along elements terminating at those points on the open end of the cavity substantially transversely farthest from the axis of the cavity, the wall of said cavity adjacent its open end being least steep in those regions along elements terminating at those points on the open end of the cavity substantially transversely farthest from the axis of the cavity and being steepest in those regions along elements terminating at those points on the open end of the cavity substantially transversely nearest the axis of the cavity.

18. An open-ended mold having a generally conical cavity with its open end uppermost and adapted for rotation about a vertical axis coinciding with the axis of such cavity, said mold being designed for formation of a funnel-shaped hollow glass article by substantially uniform centrifugal distribution over the wall of its cavity of a charge of molten glass deposited in the vertex end thereof, the open end of said cavity being essentially rectangular to substantially elliptical in outline, the shape of the horizontal cross-sectional outline of the wall of said cavity gradually changing from adjacent its vertex end to adjacent its open end, the wall of the cavity adjacent its vertex end being least steep in those regions along elements terminating at those points on the open end of the cavity substantially transversely nearest the axis of the cavity and steepest in those regions along elements terminating at those points on the open end of the cavity substantially transversely farthest from the axis of the cavity, the wall of said cavity adjacent its open end being least steep in those regions along elements terminating at those points on the open end of the cavity substantially transversely farthest from the axis of the cavity and being steepest in those regions along elements terminating at those points on the open end of the cavity substantially transversely nearest the axis of the cavity.

JAMES W. GIFFEN.

References Cited in the file of this patent

UNITED STATES PATENTS

| Number | Name | Date |
|---|---|---|
| 328,482 | Haley | Oct. 20, 1885 |
| 2,224,488 | Rendall | Dec. 10, 1940 |
| 2,478,624 | De Vine | Aug. 9, 1949 |

FOREIGN PATENTS

| Number | Country | Date |
|---|---|---|
| 223,812 | Switzerland | Oct. 15, 1942 |